L. W. ROSENTHAL & M. C. HOPKINS.
CALCULATING MACHINE.
APPLICATION FILED FEB. 10, 1915.
1,260,061.
Patented Mar. 19, 1918.
9 SHEETS—SHEET 8.
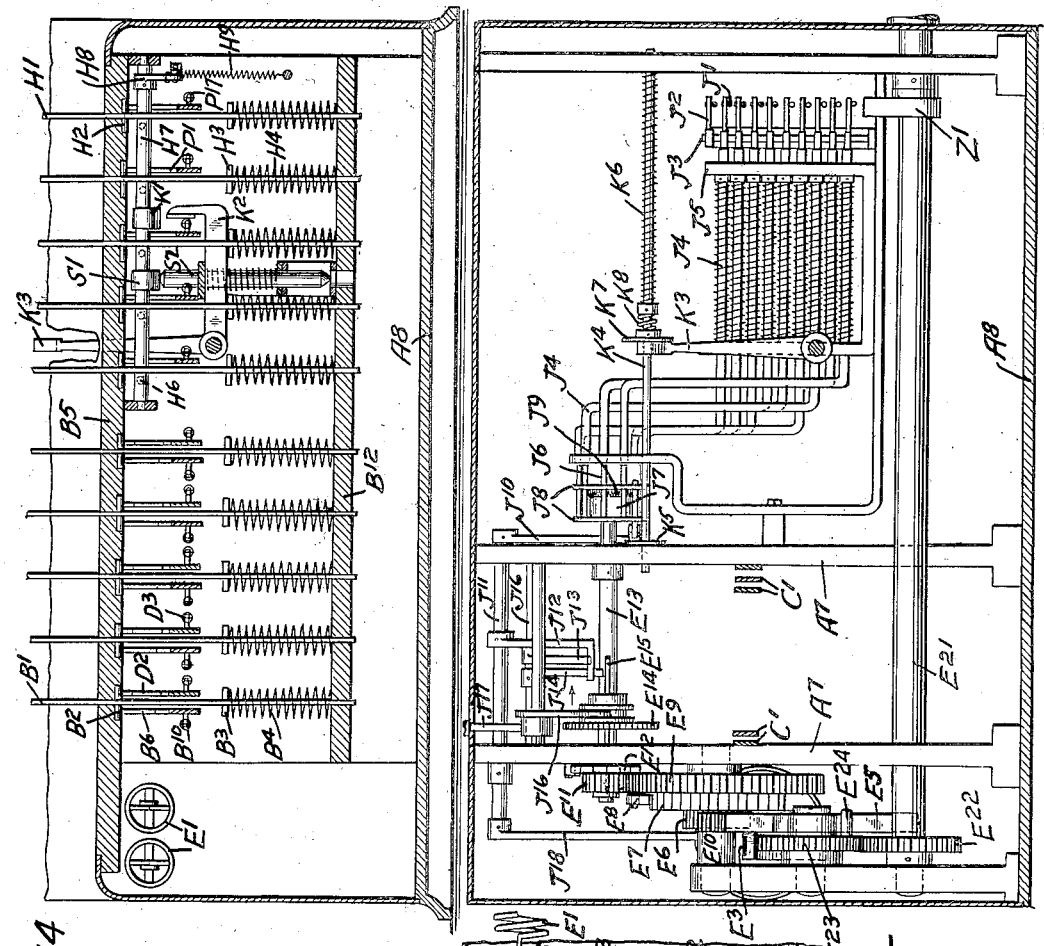
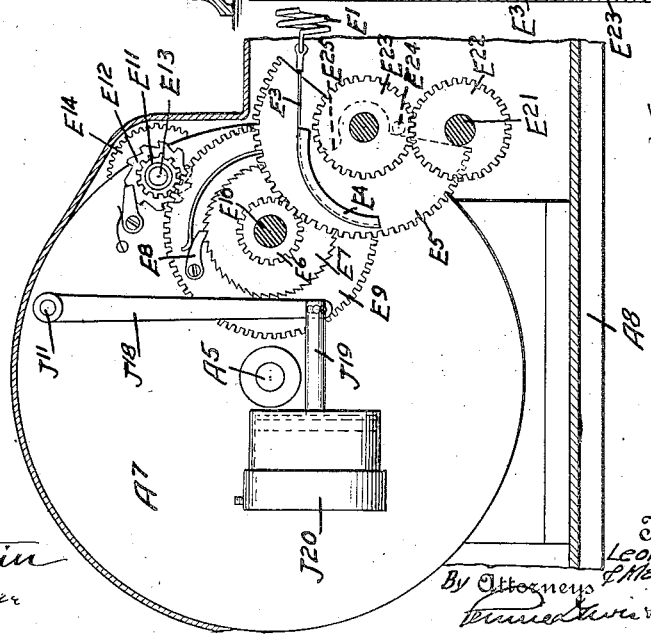

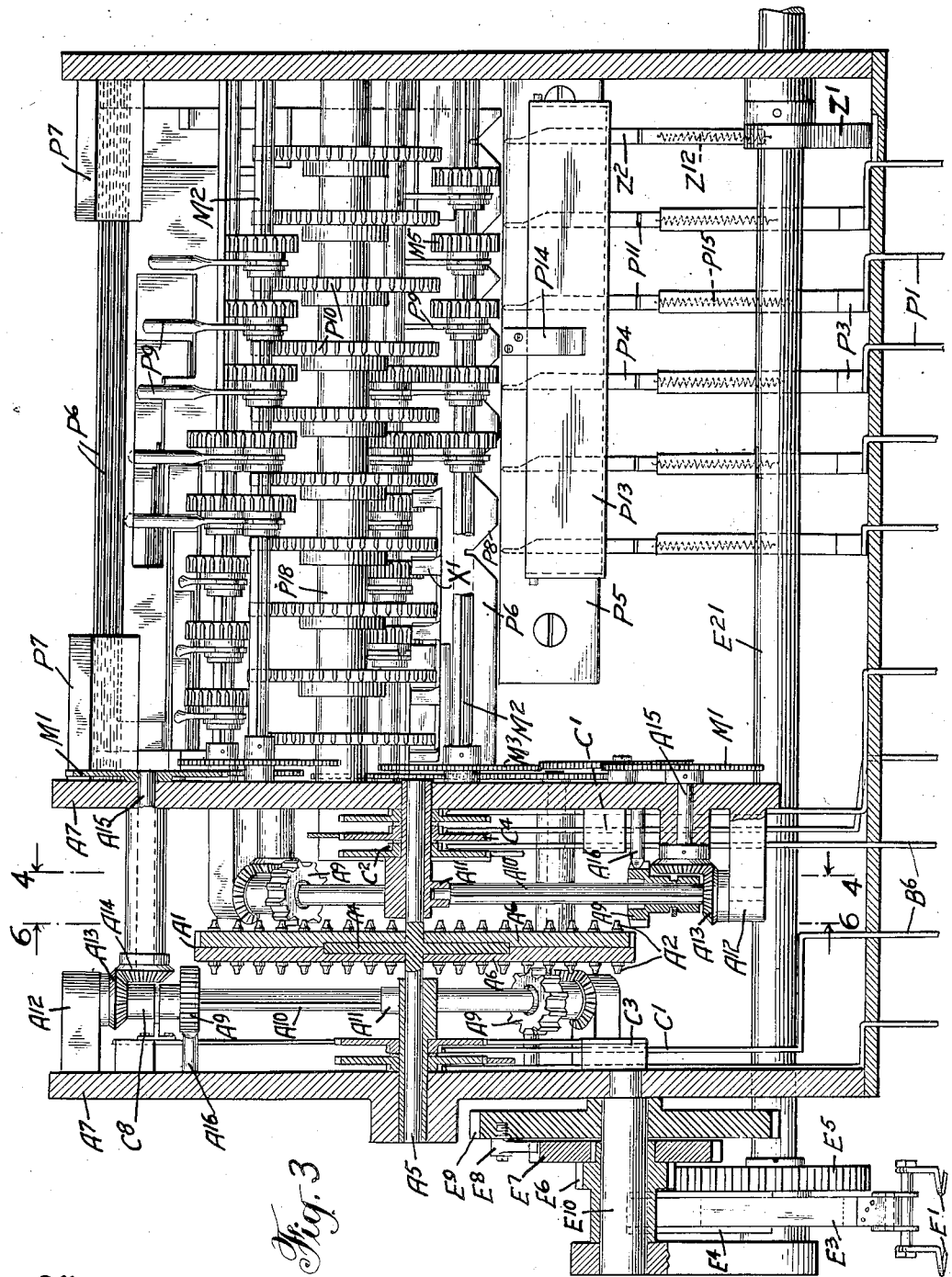

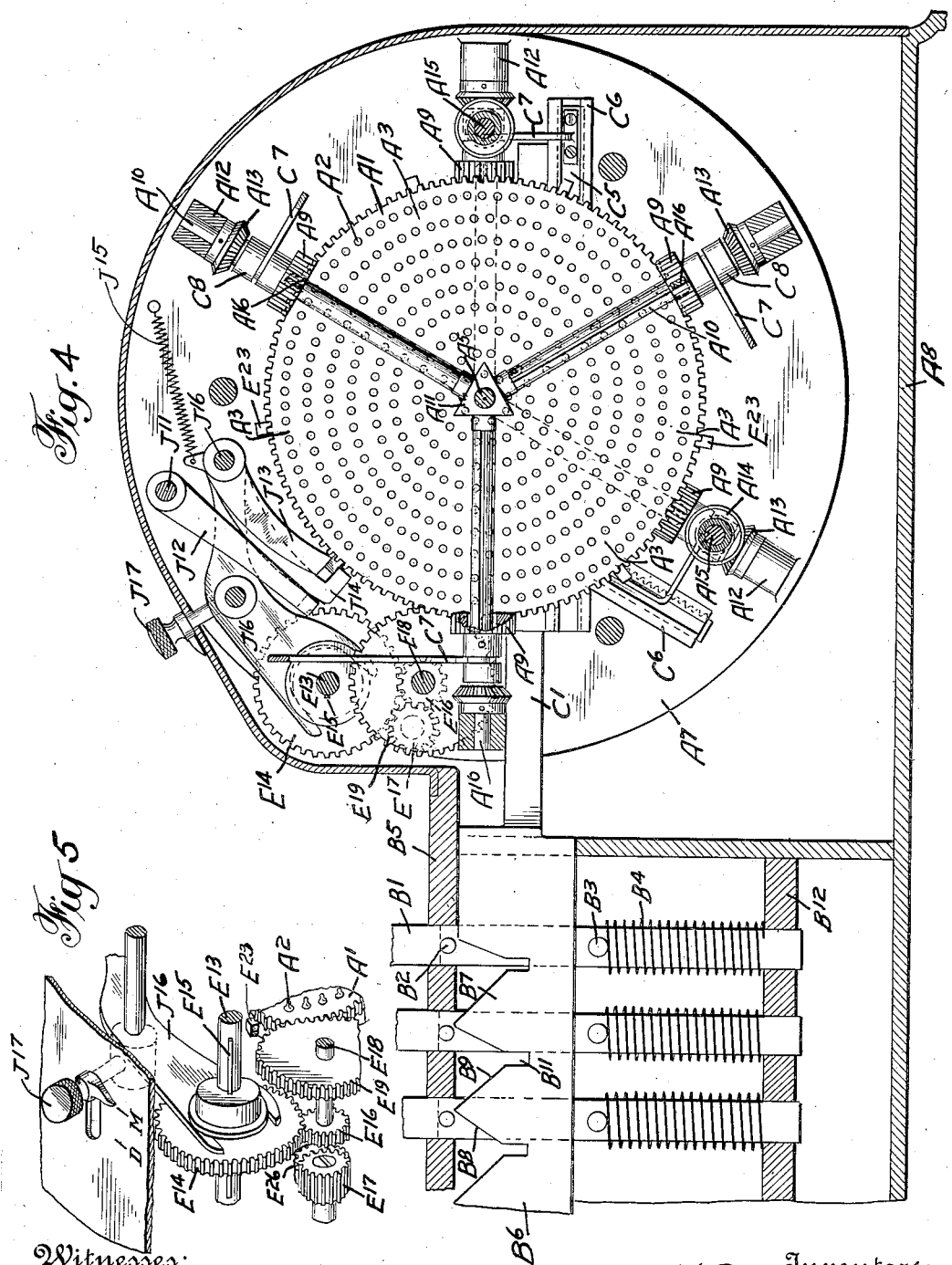

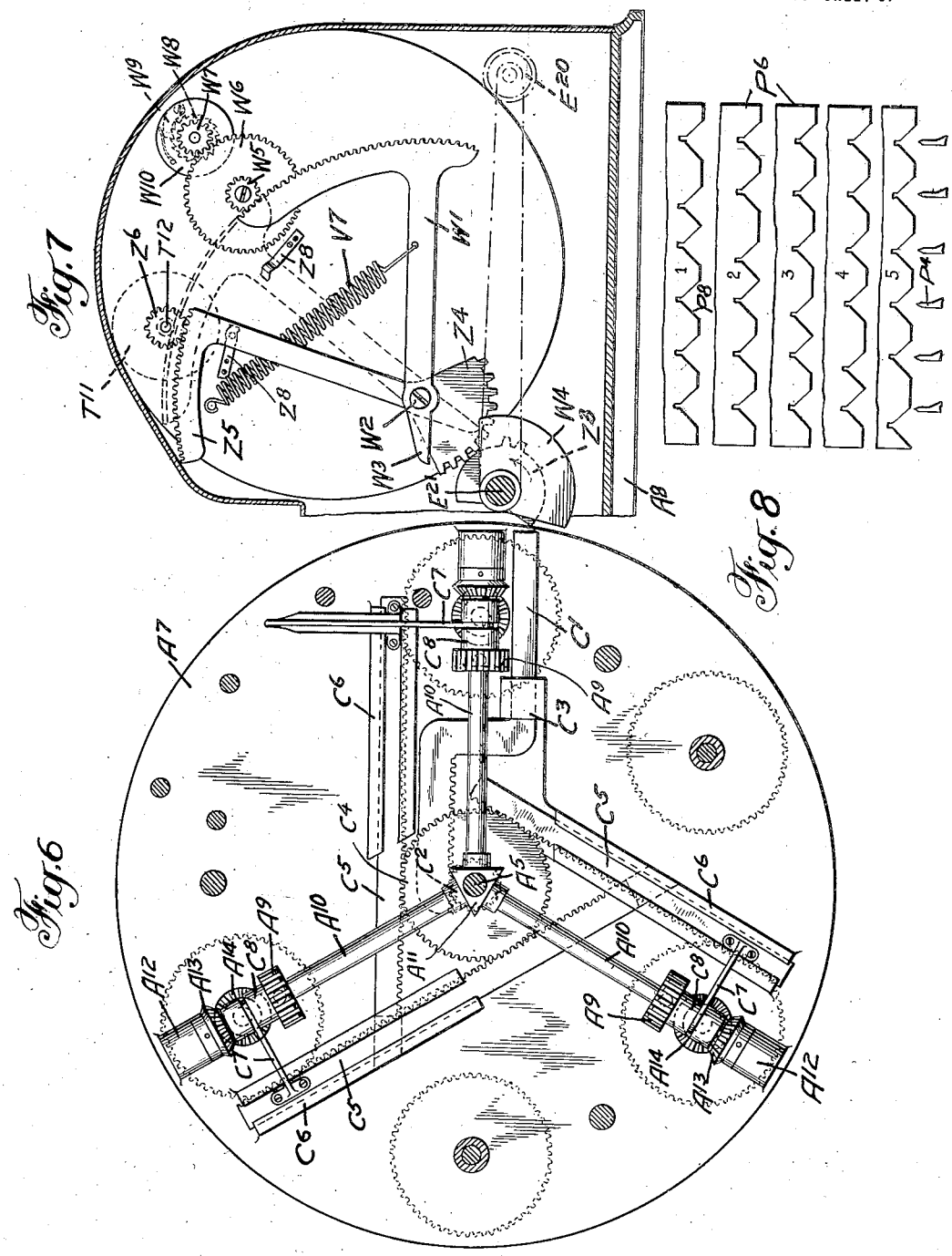

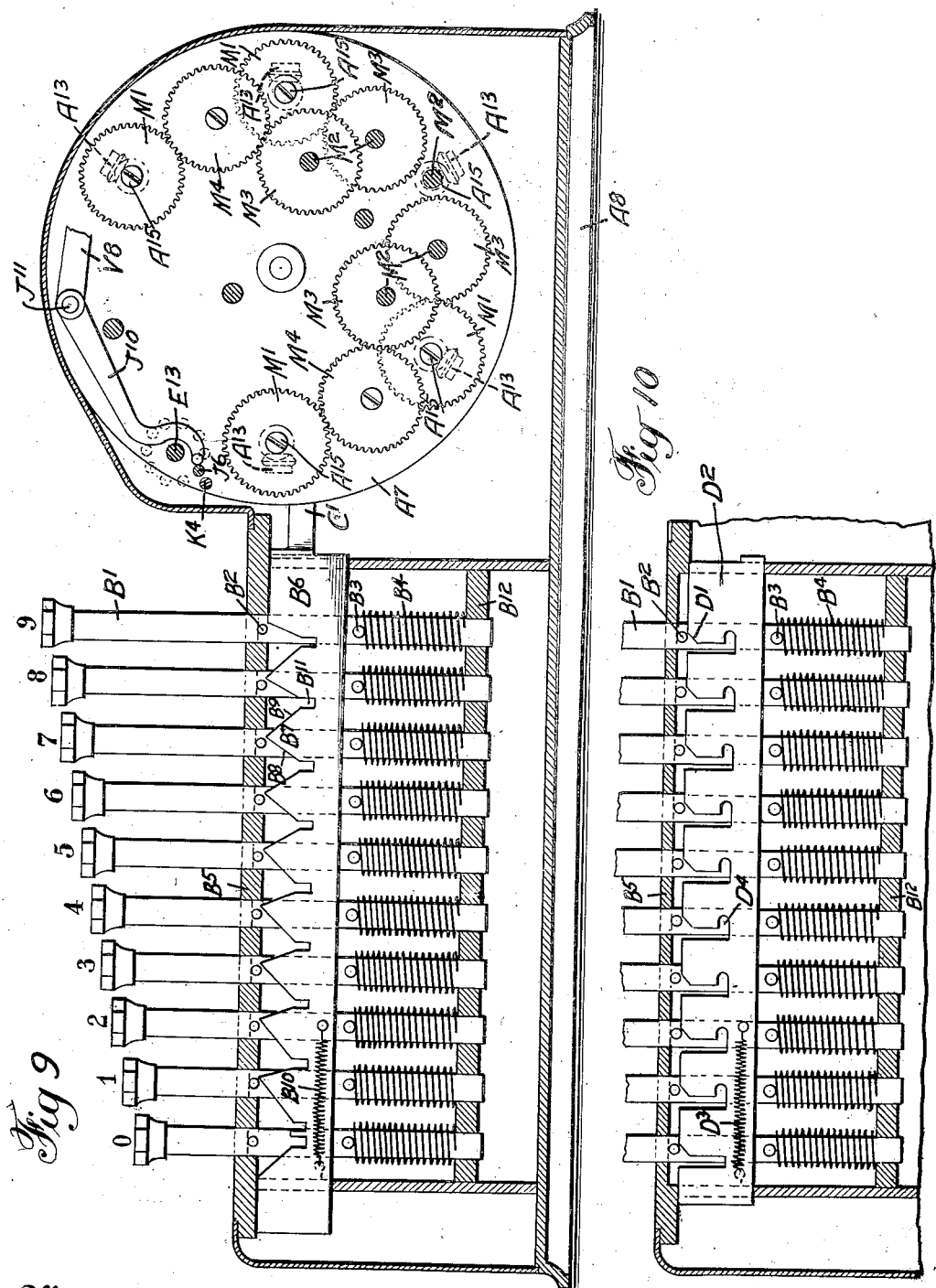

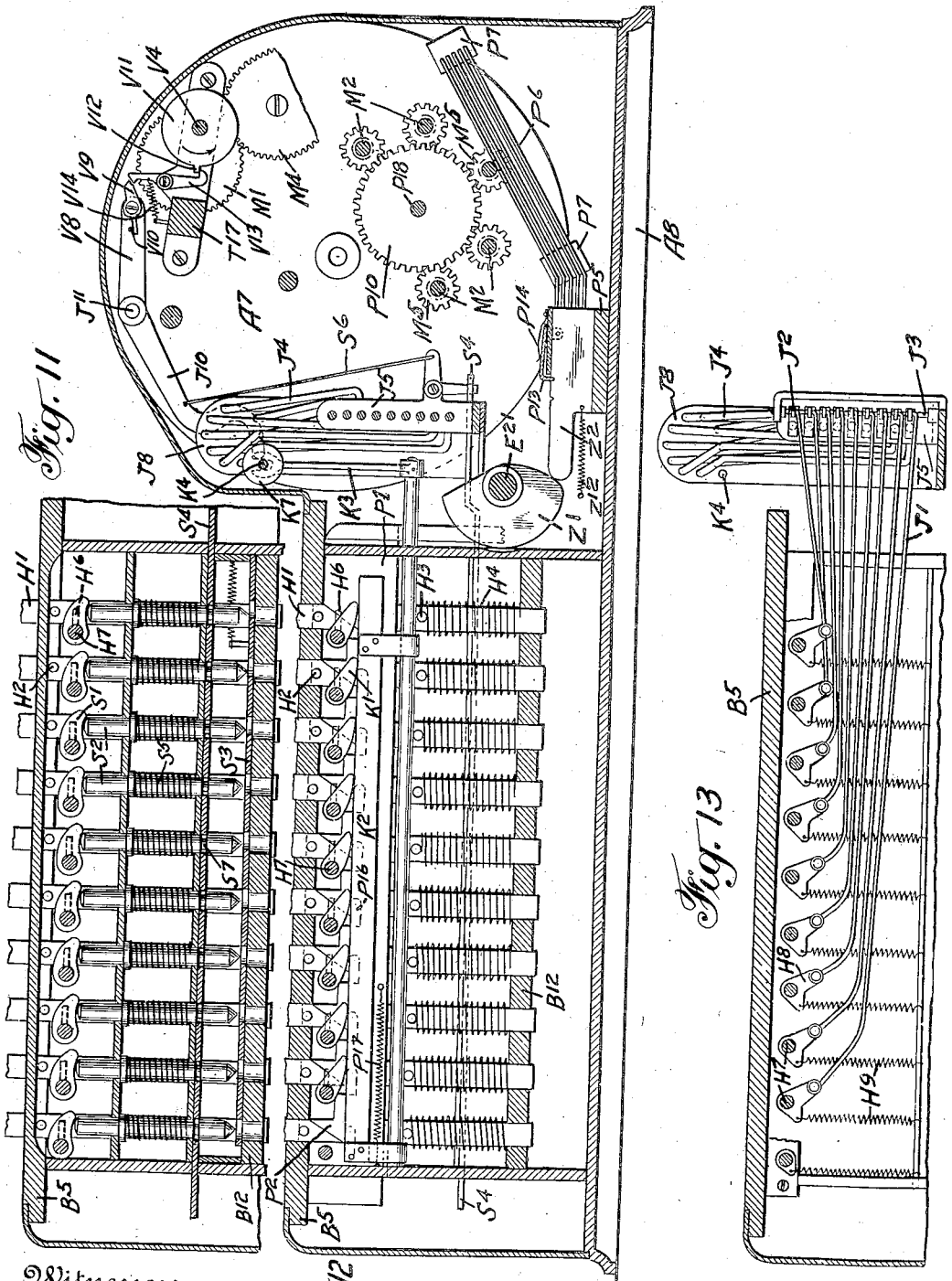

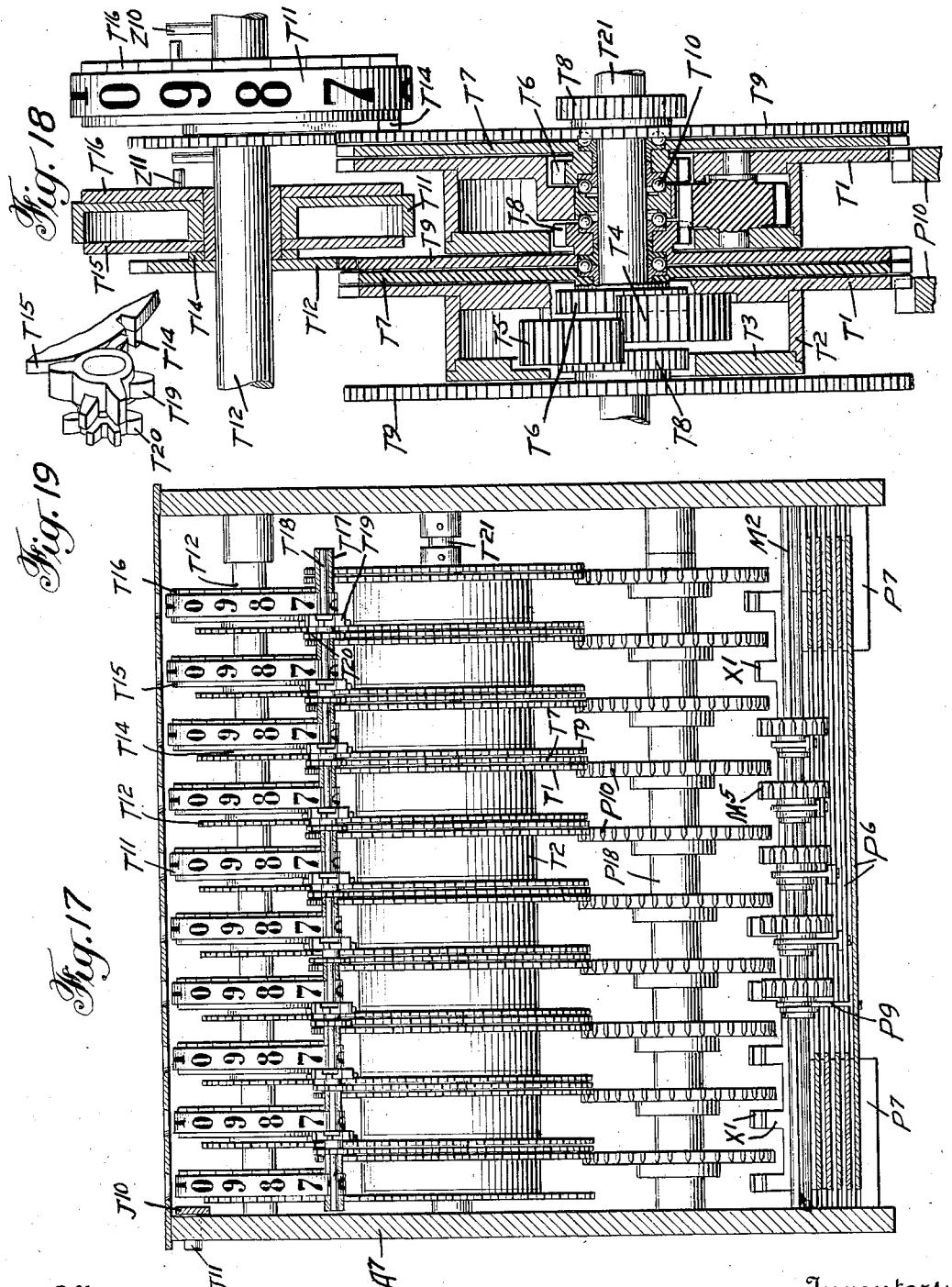

UNITED STATES PATENT OFFICE.

LEON W. ROSENTHAL, OF NEW YORK, N. Y., AND MARCUS C. HOPKINS, OF JERSEY CITY, NEW JERSEY; SAID HOPKINS ASSIGNOR TO SAID ROSENTHAL.

CALCULATING-MACHINE.

1,260,061.   Specification of Letters Patent.   Patented Mar. 19, 1918.

Application filed February 10, 1915. Serial No. 7,237.

*To all whom it may concern:*

Be it known that we, LEON W. ROSENTHAL and MARCUS C. HOPKINS, citizens of the United States, and residing, respectively, at 240 West 137th street, in the city, county, and State of New York, and 644 Bergen avenue, Jersey City, Hudson county, New Jersey, have invented certain new and useful Improvements in Calculating-Machines; and we do hereby declare the following to be a full, clear, and exact description of the invention, such as will enable others skilled in the art to which it appertains to make and use the same.

The present invention embodies improvements in calculating machines of the kind disclosed in our copending application Serial No. 710,273, filed July 18, 1912, wherein the transmitting connections are connected to the multiplying mechanism and are in constant connective relation with different series of denominations of the adding mechanism so that the partial results in multiplication may be registered on the adding mechanism in proper denominational relation to indicate the complete product of any two factors of two or more digits without mounting either the multiplying mechanism or the adding mechanism on a traveling carriage to effect the step by step movement or indentation. These improvements concern practically all elements of the prior machine and may also be embodied in other types of calculating machines, as will be understood from the following description and claims taken in connection with the accompanying drawings in which—

Fig. 3 is a section on line 3—3 of Fig. 2;

Fig. 4 is a section on line 4—4 of Fig. 3;

Fig. 5 is a perspective view of the reversing elements of the driving mechanism;

Fig. 6 is a section on line 6—6 of Fig. 3;

Fig. 7 is a section on line 7—7 of Fig. 1;

Fig. 8 is a diagrammatic view of the actuating elements of the clutch plates;

Figs. 9, 10, 11, 12, 13, 14, 15 and 16 are sections on the corresponding section lines in Fig. 1;

Fig. 17 is a section on line 17—17 of Fig. 2;

Fig. 18 is a sectional elevation of a part of the adding mechanism; and

Fig. 19 is a perspective view of a part of the transfer mechanism.

The machine shown herein has five banks of keys for setting up the multiplicand and five other banks of keys for setting up the multiplier. The operator is merely required to first set up the multiplicand and then the multiplier, the digits of each factor being set up in any order. The factors set up are shown by the depressed keys, and as each multiplier key is depressed, the machine operates to indicate on the adding mechanism the product of the entire multiplicand factor and the part of the multiplier factor then set up. A single multiplying member is used for all five multiplicand digits and it is in constant connective relation through the transmitting connections with the different series of indicators of the adding mechanism that corresponds to the different denominations of the multiplier factor. Each multiplier key not only actuates the controller to determine the amount through which a spring motor turns the multiplying member in accordance with the value of the key, but it also actuates denomination selecting mechanism to connect the multiplying mechanism with the proper series of indicators. The adding mechanism is of the differential type and it has a rectifier for bringing the indicator figures to a straight reading line after each registration. The spring motors driving the multiplying member and the rectifier are rewound by a handle, and the adding mechanism is reset to zero by the same handle.

Figure 1:
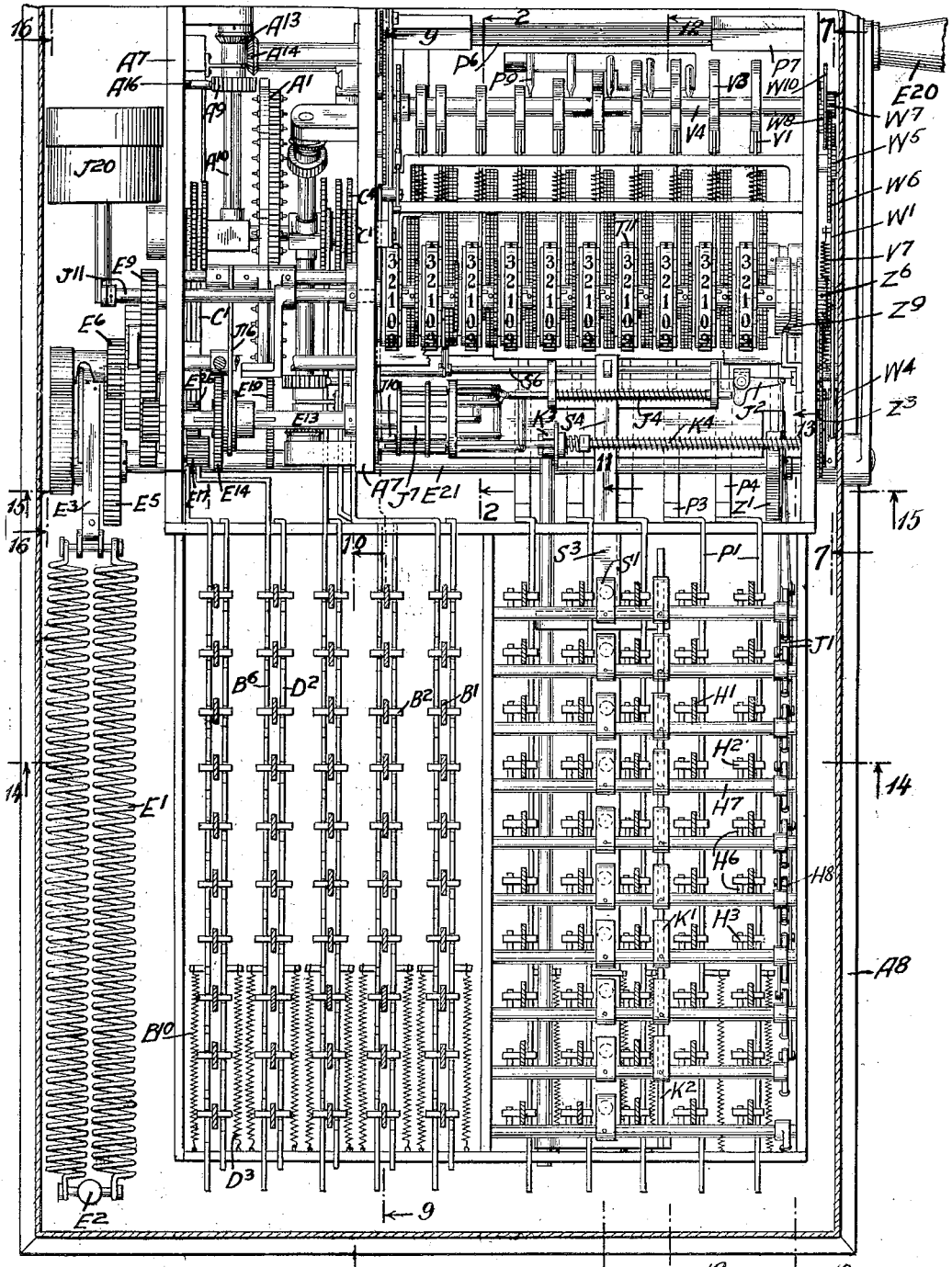
Figure 1 is a plan view of the operating parts.

The rotatable multiplying member $A^1$ is a disk having engaging points on both faces in the form of axially projecting pins $A^2$ of tooth section. (Figs. 1, 3 and 4). The pins are arranged on each surface in nine sectors with a radial passage $A^3$ between the pins of adjacent sectors, extending between the outer and inner concentric circular series. In the disk illustrated, the radial passages on one face are midway between two radial passages on the other face, so that the gears engaging the pins on the two sides may be mounted on equally spaced shafts, as shown in Fig. 4. The radial separation of adjacent circles of pins is the same from the inner circle to the outer circle of the disk, whereas the passages between the sectors are straight throughout and the pins equally spaced apart in each of the circles. The innermost circle contains 9 pins, or one per sector, and the number increases 9 per circle toward the outermost circle which contains 81 pins, or 9 per sector. The disk illustrated is of steel built up of a central disk $A^4$ integral with the shaft $A^5$ and riveted to the two cupped parts $A^6$, the pins being set in and riveted over on the back before the parts are made fast. However, the disk and shaft may be pressure cast with the pins, or turned from a single piece of metal, or in any other suitable way. The shaft $A^5$ is supported in bearings carried by the circular side plates $A^7$ which are fastened to the base plate $A^8$ of the machine.

There are three gears $A^9$ on one side of the disk, and two on the other side, each gear being slidably mounted on a splined shaft $A^{10}$ to thereby turn the shaft at any position to which it may be set. The shafts are set 120° apart on each side and extend into the bearing members $A^{11}$, which are loosely mounted on the shaft $A^5$, and also extend to the bearings $A^{12}$. The bevel gears $A^{13}$ are fastened on the shafts in mesh with like bevel gears $A^{14}$, which drive the shafts $A^{15}$.

Each gear $A^9$ is provided for a single denomination of the multiplicand factor, and it may be moved through a radial passage $A^3$ which registers with it at the time to any circle of pins $A^2$ to set up any digit 1 to 9, or it may be moved to a point outside the periphery of the multiplying disk when the multiplicand digit is 0. The gear face is wide enough to engage one circle of pins while disengaging another, and the face of the teeth is beveled off at the inner end to permit the pins, when rotating, to enter more easily between the teeth, especially when the gear is set near the center of the disk. Furthermore the gears are cupped so as to embrace the projecting part of the bearing members $A^{11}$ and thereby be movable to the innermost circle of pins. The outside diameter of each gear $A^9$ is such that there is no interference when all the gears are set to the innermost circle of pins. The locks $A^{16}$ fastened on the plates $A^7$ hold the gears against rotation when set to 0, and are so positioned that each gear engages a lock before disengaging the pins in the outermost circle, and vice versa.

There is a denominational bank of ten multiplicand keys $B^1$ for a single gear $A^9$, and all of the keys have like operating parts, each key being adapted to move the gear to the setting corresponding to the value it represents. (Figs. 1, 4, 9, 10 and 14). An upper pin $B^2$ extends outwardly on both sides of the key stem, while a lower pin $B^3$ forms an abutment for the spring $B^4$ which presses against the base plate $B^{12}$ of the keyboard and tends to force the key to its elevated position, wherein the upper pin abuts against the underside of the cover plate $B^5$. A setting bar $B^6$ is provided for each bank of keys, and each bar is provided with a cam portion $B^7$ for each key of the bank, the cam portion for 0 key having a rear incline only, and that for the 9 key having a front incline only. The front incline $B^8$ of the cam portions have different slopes and likewise with the rear incline $B^9$, the total lead of the inclines of each cam portion $B^7$ being more than the distance between the centers of adjacent pins $B^2$ by the amount of movement between the successive positions of the setting bar. When a setting bar is in the position shown in the drawings, all of the pins $B^2$ are near the top and just in front of the front inclines $B^8$. If now a key other than 0 is depressed, the setting bar is moved rearwardly, that is to the right in Fig. 9, against the tension of spring $B^{10}$ until the pin $B^2$ of that key enters the vertical slot $B^{11}$. Upon depressing any other key other than 0 in the same bank, the setting bar is moved one way or the other, the pin engaging the front incline to move the setting bar farther to the right if the key represents a digit of lower value than the last one depressed, and the pin engaging the back incline if a higher digit is represented by the key. The 0 key is adapted to move the setting bar back to its normal position at the extreme left.

The setting bar $B^6$ is connected to a rack $C^1$ which meshes with a gear $C^2$ and which slides in guides $C^3$. (Figs. 1, 3, 4, 6 and 15). Each gear $C^2$ is fastened to a larger gear $C^4$ and turns therewith on the shaft $A^5$. Another rack $C^5$ slides in a guide $C^6$ in mesh with the gear $C^4$ and carries a fork $C^7$ engaging the slotted collar $C^8$ of the gear $A^9$ so as to move the gear along the splined shaft $A^{10}$. By means of the compound gearing previously described, the depression of any multiplicand key $B^1$ positively moves the gear $A^9$ of corresponding denomination in one direction or the other through a passage $A^3$ to the circle of pins $A^2$ representing the value of the key, and the depression of the 0 key positively moves the gear into engagement with the lock $A^{16}$ outside of the periphery of the multiplying disk.

No two multiplicand keys $B^1$ in the same bank can be simultaneously depressed to their lowermost position, inasmuch as the distance between the pins $B^2$ is greater than the distance between corresponding slots $B^{11}$. Upon depressing any key, the part of the pin $B^2$ on the other side of the key stem first engages the incline $D^1$ of the latch plate $D^2$ for that bank of keys, and then moves to the bottom of the vertical slot, whereupon the spring $D^3$ pulls the latch plate back and latches the pin in the horizontal slot $D^4$, except in the case of the 0 key which is always moved by a spring to its elevated position. (Figs. 1, 10 and 14). As soon as another key in that bank is partly depressed, the key previously latched down is released, and then elevated by its spring $B^4$. Thus, only one multiplicand key in a bank can remain down at a time, but any other key may be depressed at any time to positively move the gear $A^9$ of that denomination to any other desired setting.

Having described the means by which the multiplicand factor of five or less digits is set up, the means by which this factor is multiplied by each multiplier digit in turn will now be described.

The multiplying mechanism comprising the multiplying member $A^1$ and the gears $A^9$, is driven by a spring motor comprising the two tension springs $E^1$ which are anchored to the post $E^2$ and attached at the other end to the flexible strap $E^3$. (Figs. 1, 3, 4, 5, 15 and 16). This strap extends over the eccentric cam $E^4$ and is fastened thereto at the end of maximum radius from the axis of the toothed segment $E^5$, so as to equalize the pull of the springs as their extension vary. The toothed segment carries the cam and meshes with a pinion $E^6$ fastened to the ratchet $E^7$ which drives the spring pressed pawl $E^8$ carried by the gear $E^9$. The pinion, ratchet and gear are loose on a shaft $E^{10}$. The gear $E^9$ drives the pinion $E^{11}$ and the ten toothed ratchet $E^{12}$. The shaft $E^{13}$ passes through the side plates $A^7$ and has the pinion $E^{11}$ and ratchet $E^{12}$ fastened to it, while the gear $E^{14}$ is slidable along the key $E^{15}$. In one position along the key, the gear $E^{14}$ engages the pinion $E^{16}$, and in another position along the key it engages the wide pinion $E^{17}$, which is permanently engaged with the pinion $E^{26}$. The shaft $E^{18}$, on which the gear is fast, also carries a gear $E^{19}$ in mesh with the gear teeth around the periphery of the multiplying disk $A^1$. Thus the driving mechanism rotates the multiplying disk in one direction or the other depending upon the position of the gear $E^{14}$.

The winding handle $E^{20}$ is fastened on the shaft $E^{21}$ and carries a gear $E^{22}$ meshed with a gear $E^{23}$. The gear $E^{23}$ is loose on the stud and has a pin $E^{24}$ arranged to enter the circular slot $E^{25}$ in the toothed segment, which also is loose on the stud. Upon pulling the winding handle $E^{20}$, the pin turns the segment until it strikes the shaft $E^{21}$, as shown in the drawings, wherein the springs $E^1$ are fully tensioned. In this period, the pawl $E^8$ slides over the teeth of its ratchet and the multiplying disk is not turned. In the driving period, the springs rotate the multiplying disk through the segment and associated gearing, the ratio being such that the shaft $E^{13}$ makes nine-tenths of a rotation to one complete rotation of the disk. A pawl coöperating with the ratchet $E^{12}$ prevents rebound of the multiplying disk, and the engagement of the other side of the segment with the shaft $E^{21}$ prevents the segment from coming out of engagement with the pinion $E^6$.

The multiplier keys $H^1$ are arranged in five denominational banks, each containing ten keys 0 to 9. Each key has an upper pin $H^2$ projecting outwardly on both sides of the key stem, and also a lower pin $H^3$ against which the spring $H^4$ presses from the base plate $B^{12}$ to raise the key to its elevated position wherein the pin $H^2$ abuts the under side of the cover plate $B^5$. There are ten rocking shafts $H^7$ extending across the five banks of multiplier keys. (Figs. 1, 2, 3, 11, 12 and 13). Each rocking shaft has five radially extending pins $H^6$ lying in the path of the pins $H^2$, so that upon depression of any of the multiplier keys of the same value, irrespective of the denomination, the rocking shaft is turned in its bearings. Each of the rocking shafts, excepting the one for the 0 keys, has a crank $H^8$ fastened on its outer end, and a spring $H^9$ attached to one arm of the crank tends to hold the rocking shaft in normal position wherein the pins $H^6$ lie horizontally. The other arms of the cranks $H^8$ are connected by individual connections $J^1$ to the bell cranks $J^2$ which are loosely mounted on the vertical rod $J^3$. Each bell crank is mounted in position to force a spring pressed push rod $J^4$ through bearings in the bracket $J^5$ against a projecting stop pin $J^6$ of the rotatable controller $J^7$. There are nine push rods corresponding to the nine digits 1 to 9, and ten stop pins, the arrangement being such that whenever the controller is at rest, nine of the stop pins register with the nine push rods, while the tenth stop pin is out of the path of all the push rods. The ten stop pins are supported for longitudinal movement by the end plates $J^8$, and the spring $J^9$ is designed to hold all the stop pins by light friction in either longitudinal position. (Fig. 15). The controller is fast on the shaft $E^{13}$ and it makes a tenth of a rotation for each ninth of a rotation of the multiplying disk, that is for the passage of each sector of pins $A^2$. In the rotation of the controller, the stop pin which has been projected by a push rod strikes against the dog $J^{10}$, which is fastened on the end of the shaft $J^{11}$ carrying the arm $J^{12}$ which rests on the two pawls $J^{13}$ and $J^{14}$. In the raised position in which the spring $J^{15}$ tends to hold the dog (Fig. 4), the pawls are raised above the path of the nine abutments $E^{28}$ on the periphery of the multiplying disk to one side of the teeth thereon, but in the position to which the dog is forced by the stop pin projected at the time, one or the other of the pawls strikes an abutment, stopping the multiplying disk with the radial passages $A^3$ in registry with the gears $A^9$ on both sides and holding the disk against further movement by the spring motor. The two pawls are movable with a shipper $J^{16}$ carrying the gear $E^{14}$ also, and the arrangement is such that when this gear is moved by the handle $J^{17}$ into position to effect rotation of the multiplying disk in anti-clockwise direction as seen in Fig. 4, for multiplication or addition, the pawl $J^{14}$ engages the abutments $E^{23}$, and when the gear is moved to its other position for effecting rotation of the multiplying disk in the opposite direction, for division or subtraction, the pawl $J^{13}$ engages the abutments. The shaft $J^{11}$ also carries a lever $J^{18}$ attached to the piston rod $J^{19}$ of an air dash pot $J^{20}$ so as to retard the movement of the multiplying disk and associated mechanism to a gradual stop. This prevents undue wear in the machine, but at the same time does not add to the strength of the spring motor required to force the multiplying disk to its exact stopping position.

Each of the rocking shafts $H^7$, excepting the one for the 0 key, carries a cam $K^1$ adapted to depress the arbor $K^2$ when any multiplier key other than 0 is depressed, and to thereby swing the forked lever $K^3$ toward the right in Fig. 15. (Also see Figs. 1, 12, 14 and 15). The releasing rod $K^4$ is supported for longitudinal movements and carries a finger $K^5$ normally held against the side plate $A^7$ by the spring $K^6$. The collar $K^7$ is held against the forked lever by the spring $K^8$, which is stiff enough to resist compression until the finger is stopped in its movement to the right by the end plate $J^8$ of the controller. The finger is so designed that upon movement to the right, it returns to the normal ineffective position that stop pin $J^6$ which holds the dog $J^{10}$ in depressed position.

The operation of the driving and controlling mechanism will now be described. During the stroke of a multiplier key other than 0, the pin $H^2$ strikes the pin $H^6$ and turns the rocking shaft until the crank $H^8$ pulls sufficiently on the connection $J^1$ to cause the bell crank $J^2$ to force in a push rod $J^4$. The stop pin which corresponds to the value of the key depressed at the time is thereby pushed to its stopping position. At the same time, the rocking shaft also rocks the cam $K^1$ to depress the arbor $K^2$. The forked lever $K^3$ then moves the releasing rod $K^4$ to that position at which the finger $K^5$ has pushed to its normally ineffective position that stop pin which is holding the dog $J^{10}$ depressed at the time. The dog is still held depressed by the finger, but in the last part of the key stroke, the pin $H^6$ passes out of the range of the pin $H^2$. The spring $H^9$ then turns the rocking shaft back and the releasing rod $K^4$ is at the same time forced back out of engagement with the dog by the spring $K^6$. The spring $J^{15}$ now rocks the shaft $J^{16}$, raising the dog until its curved part strikes the shaft $E^{13}$, and raising the pawls $J^{13}$ and $J^{14}$ until they clear the top of the abutments $E^{23}$. The spring motor then being released, rotates the multiplying disk until the stop pin, which was projected to stopping position, depresses the dog and the pawls, the pins $A^2$ turning the gears $A^9$ through the predetermined number of teeth representing in each case the product of the multiplicand digit set up by the gear $A^9$ and the multiplier digit measured by the number of sectors through which the disk is turned. The dash pot $J^{20}$ causes a gradual reduction of speed and a gradual depression of the pawls until one of them engages an abutment and thereby positively stops the multiplying disk in exact position after its rotation through the predetermined number of sectors, wherein all of the gears $A^9$ may be moved along the radial passages $A^3$ to any other setting, if desired. The subsequent elevation of a multiplier key turns the rocking shaft $H^7$ in the reverse direction, but without effect, the spring $H^9$ restoring it to normal position ready for another actuation by a multiplier key of the same value.

Having described the means by which the multiplicand factor is multiplied by each multiplier digit in turn, the means by which the partial results so obtained are registered in proper denominational relation on the adding mechanism will now be described.

The transmitting connections extend from the multiplying mechanism to the adding mechanism and transmit the rotation of the gears $A^9$ to the proper indicators. The shafts $A^{15}$ extend through the side plate $A^7$ and all of them except one carry the gears $M^1$, which drive the parallel-extending circularly-disposed shafts $M^2$. (Figs. 2, 3, 9 and 11). The two shafts $A^{15}$ driven by the gears $A^9$ on the left hand side of the multiplying disk in Fig. 3, drive shafts $M^2$ through gears $M^1$, $M^3$ while of the three shafts $A^{15}$ driven by the gears $A^9$ on the right hand side of the disk, two drive through the gears $M^1$, $M^4$, $M^3$, and the third is fast with the shaft $M^2$. Thus, the rotation of all the shafts $M^2$ is in the same direction, notwithstanding the fact that the gears $A^9$ on the two sides of the multiplying disk are driven in opposite directions thereby. Also, the circle on which the shafts $M^2$ are disposed is of considerable less diameter than that of the circle through the shafts $A^{15}$, whereby the shafts $M^2$ may be more easily connected to different series of denominations of the adding mechanism, as will hereinafter appear. Each shaft $M^2$ carries five gears $M^5$, each slidable therealong in a groove independently of the others.

There are five denomination plates $P^1$, each extending along a bank of multiplier keys on the side opposite from the pins $H^6$ of the rocking shafts. (Figs. 1, 2, 3, 5, 12 and 14). Each plate has ten cams $P^2$, the inclines of which lie in the path of the pins $H^2$, so that upon depression of any key of a denomination, irrespective of its value, the corresponding plate $P^1$ is forced the same distance toward the back of the machine. Each denomination plate has a push piece $P^3$ normally abutting a finger $P^4$, slidable in a guide of the rigidly secured member $P^5$. The rear part of each finger is thin so as to enter the narrow part of the V-slots $P^8$ in the five superposed clutch plates $P^6$, which are mounted in the combs $P^7$ for guided sliding movements. There are six V-slots $P^8$ in each clutch plate, the one at the extreme right being provided for use in the clearing operations as will appear hereinafter. Of the remaining five V-slots in each clutch plate, four have their contracted parts exactly opposite four of the fingers $P^4$, while the fifth one is offset to the left of the fifth finger. The offset slot on the lowermost clutch plate (numbered 5 in Fig. 8) is the one at the extreme left; the offset slot of plate 4 is the second from the left; and so on to the top clutch plate 1 which has its offset slot in the fifth from the left.

Each clutch plate carries five yokes $P^9$ embracing the grooves in the collars of five gears $M^5$, and each clutch plate is cut out so that the yokes of the plate below it pass through it and are capable of the relative sidewise movement required. The five yokes of a clutch plate engage five gears $M^5$ on five different shafts $M^2$ (Figs. 2 and 3), while the five yokes of each of the other clutch plates engage five other gears likewise on the five shafts. The gears $M^5$ are slidable on their shafts into engagement with the gears $P^{10}$ which are mounted on the shaft $P^{18}$ and which drive the indicators of the adding mechanism, the facing ends of the gears $M^4$ and $P^{10}$ being beveled to an edge so as to slide easily into mesh even from an offset position. The five gears $M^5$ shifted by the uppermost clutch plate engage the five gears $P^{10}$ on the right in Figs. 3 and 17, corresponding to a multiplier digit of units denomination; the five gears shifted by the second clutch plate from the top engage the second to the sixth gear $P^{10}$ from the one on the extreme right, corresponding to a multiplier digit of tens denomination; and so on to the lowermost clutch plate which engages the five gears $M^5$ with the fifth to the ninth gears $P^{10}$ from the one on the extreme right, corresponding to a multiplier digit of ten thousands denomination.

The gear $P^{10}$ on the extreme left is a carry over gear, as will appear hereinafter, and is never engaged by any of the gears $M^5$.

Each of the fingers has two slots $P^{11}$ and $P^{12}$. When a finger is pushed all the way back, its slot $P^{11}$ is latched by the overhanging swinging cover $P^{13}$ and held by the spring $P^{14}$ with its thin end in the contracted portions of the corresponding V-slots of the five clutch plates. However, as soon as another finger is started toward the back of the machine, the cover $P^{13}$ is slightly raised, allowing the extended spring $P^{15}$ of the previously projected finger to pull it back to its forward position. Thus, the clutch plate which was previously shifted to the right is now shifted back to the position where all the gears $M^5$ moved by it are disengaged from the gears $P^{10}$, and simultaneously another clutch plate is shifted to the right to engage another set of gears $M^5$ with another series of gears $P^{10}$ corresponding to another denomination of the multiplier factor.

The denomination selecting mechanism just described operates as follows: While a multiplier key is being depressed, the plate $P^1$ of the denomination of the key is moved to engage five of the gears $M^5$ with five of the gears $P^{10}$ before the pawl is raised out of engagement with the abutment $E^{23}$ to permit rotation of the multiplying disk. However, a stop pin $J^6$ has been projected by this time, so that while the multiplicand factor set up by the gears $A^9$ is being multiplied by the multiplier digit having the value of the key depressed, the partial result is being registered on the series of indicators of the adding mechanism corresponding to the denomination of the key depressed. When a key of another denomination is then depressed, another set of five of the gears $M^5$ is engaged with another series of gears $P^{10}$, and the partial result of the multiplicand factor and the new multiplier digit is registered on the series of indicators of the adding mechanism corresponding to the denomination of that key. This operation is repeated on each of the multiplier digits in turn. Thus the partial results are added on the indicators of the adding mechanism in proper denominational relation to indicate thereon the complete product of the multiplicand factor set up by depressing the keys $B^1$ and the multiplier factor set up by depressing the keys $H^1$.

During the end of a stroke of a multiplier key other than 0, just after the clutch plates $P^6$ have been completely shifted and the releasing rod $K^4$ operated to permit the rotation of the muliplying disk, the pin $H^2$ comes opposite the horizontal slot $P^{16}$ of the denomination plate $P^1$. The spring $P^{17}$ then pulls the plate back and latches the depressed key down, the finger $P^4$ of any denomination then being capable of actuation. Any multiplier key latched down will be elevated by its spring H⁴ upon depressing another key in the same bank during the next problem, or the multiplier keyboard may be cleared at the end of the problem by depressing the 0 keys one after another. It will be observed that, although the clutch plates are shifted, the releasing rod K⁴ is not actuated upon depressing the 0 keys, the cam K¹ being omitted on the rocking shaft H⁷ for the 0 keys for this reason.

The V-slots of the clutch plates P⁶ prevent the complete depression of any two multiplier keys of different denomination at the same time. However, a locking mechanism is provided for preventing the simultaneous depression of any two multiplier keys of different value, whether of the same or different denominations. In fact, the arrangement is such that no two keys can be sufficiently depressed to simultaneously project two of the controller stop pins to stopping position, and such that no multiplier key can be depressed while the multiplying disk is rotating. (Figs. 1, 11 and 14.) For this purpose, each rocking shaft H⁷, including the one for the 0 keys, has a cam S¹ which begins to depress a plunger S² as soon as any multiplier key of the corresponding value is started down. The plungers have pointed ends and the points register with the holes in the sliding plate S³ no matter what position the plate may have, the holes being spaced slightly farther apart than the plungers. Thus, no two plungers can be depressed more than a small amount, which in fact is insufficient to permit even a slight actuation of the push rods J⁴. However, any one plunger may be depressed all the way down, the plate being shifted thereby until the corresponding hole registers with the body portion of the plunger. The holes of the lock plate S⁴ register with the body portion of the plungers when the dog J¹⁰ is depressed to its stopping position. Just before the multiplying disk is released, the depressed cam S¹ is swung up by the spring H⁹ and the spring S⁵ elevates the depressed plunger. Then as the dog swings up to release the pawl from the abutment on the multiplying disk, the connection S⁶ (Figs. 1 and 12), shifts the lock plate forward and causes the rim of all the holes to engage the reduced portion S⁷ in the plungers, including the one previously depressed. In this way, all the plungers are locked as long as the multiplying disk is rotating and thus no multiplier key can be depressed until the multiplying disk is again stopped, whereupon the dog in its movement of depression shifts the sliding plate to again release all the plungers.

The adding mechanism embodies individual differential gearings for the ten indicators, and a rectifier which operates directly at the end of the registration of each partial result to progressively take up the back lash between the indicators in the order of ascending denomination. In this way, the previous carries between the indicators are completed and the figures forming the result are brought in a straight reading line throughout. Many adding mechanisms of the differential type have failed in practical operation for two reasons; first, because of the back lash present in the gears for each indicator and in the intermittent gearing for carrying between the indicators; and second, because of the excessive power required to perform the carries, especially when a series of simultaneous carries results from the registration of a figure on one of the indicators. The back lash results in effect in a spiral twist throughout the adding mechanism, and to mesh the gearing tightly to eliminate the back lash increases the difficulty in carrying. Furthermore, springs for producing or aiding the carries usually change the back lash to forward lash and results in the spiral twist in the opposite direction. The rectifier permits a loose mesh between the gears, inasmuch as the lash in one direction or the other is progressively taken up at the end of the operation and the indicators are accurately spotted. The loose mesh between the gears reduces the power required in carrying because each carry becomes less and less complete throughout a series of indicators, and because the gears are turned more easily. However, we have found that even this arrangement does not operate with sufficient ease and steadiness in many cases. By mounting the differential gearings on ball bearings, as shown herein, not only are there difficulties eliminated, but an important practical advantage is secured, in that the differential gearings may be packed tightly against each other and also mounted tightly on their supporting shaft without undue sacrifice in ease and steadiness of operation. As a result, the gears may be reasily assembled to run true and without variation during their rotation, and when a rectifier is used in the organization, a loose mesh may be introduced to further increase the ease and steadiness of operation.

The adding mechanism contains ten differential gearings, all alike, except that the one of lowest denomination has its transfer receiving component permanently locked to the frame. (Figs. 1, 2, 17 and 18.) The driving component of each differential gearing, comprises the gear T¹ permanently meshed with one of the gears P¹⁰ and the gear box T² with a removable cover T³. Two gears T⁴ and T⁵ are mounted for rotation in the box and are carried thereby, engaging each other over a part of their face. The gear $T^4$ engages the toothed ring $T^6$ fixed in an axial position to the transfer receiving component $T^7$, and the gear $T^5$ engages the toothed ring $T^8$ likewise fixed to the indicator actuating component $T^9$. The three components are mounted on ball bearings $T^{10}$, supported from the shaft $T^{21}$, and are separated thereby from each other and from outside components of adjacent gearings. Although we prefer to mount all three components on ball bearings, as shown herein, yet the adding mechanism will operate with nearly the same ease and steadiness if only the transfer receiving and the indicator actuating components are so mounted, because the transfer mechanism, which heretofore has introduced difficulties in operation, does not rotate the driving component in effecting carries between the indicators. The indicators $T^{11}$ are rotatably mounted on the shaft $T^{12}$ and each one has fastened to it, a gear $T^{12}$ of twenty teeth in mesh with the indicator actuating component $T^9$, a segment $T^{14}$ of two teeth, a cut out disk $T^{15}$, and a star wheel $T^{16}$ of ten teeth. The indicator of highest denomination is not provided with a segment or a cut out disk, since it is merely a carry over indicator from the one below it. The bridge $T^{17}$ carries a shaft $T^{18}$ on which is mounted a six-tooth three-tooth gear $T^{19}$ of the well known kind for each indicator except the one of highest denomination. (Fig. 19.) The three-tooth part of each of these gears engages the cut out disk $T^{15}$, while the six-tooth part is engaged by the segment $T^{14}$ during each rotation of the indicator. Each of these gears carries a gear $T^{20}$ of six teeth in mesh with the transfer receiving component $T^7$ of the differential gearing of next higher denomination. Thus, when an indicator moves from 9 to 0 in multiplication or addition, or from 0 to 9 in division or subtraction, the transfer receiving component of the next higher denomination is turned through two teeth, and the corresponding indicator through one figure in the same direction as the indicator from which the transfer was made. Also, when the multiplying disk turns through one pin, the gear $A^9$ which is actuated thereby at the time turns through one tooth and turns the corresponding indicator one figure in the direction produced by the transfer.

Back lash or looseness between the gears of the differential gearings, and between the elements of the intermittent transfer gearing, is purposely introduced in order to produce ease and steadiness in operation, and to facilitate assembling of the parts. The total back lash between adjacent indicators in the machine disclosed herein amounts to slightly less than one-half a figure on the indicator. This back lash is accumulative throughout the adding mechanism, and at the end of a registration involving transfers between the indicators, it results in effecting a spiral twist throughout, the twist occurring in one direction after multiplication or addition, and in the other direction after division or subtraction. In order to progressively complete the transfers which were gradually lost as a result of the back lash between the gears, and to take up the back lash in each differential gearing, there is provided a rectifier which operates on the indicators directly after the completion of each registration. The rectifier operates on the indicators in the order of ascending denomination from the lowest to the highest, and it spots the indicators so that at the end of the rectifying operation the result appears in a straight reading line throughout.

Figure 2:
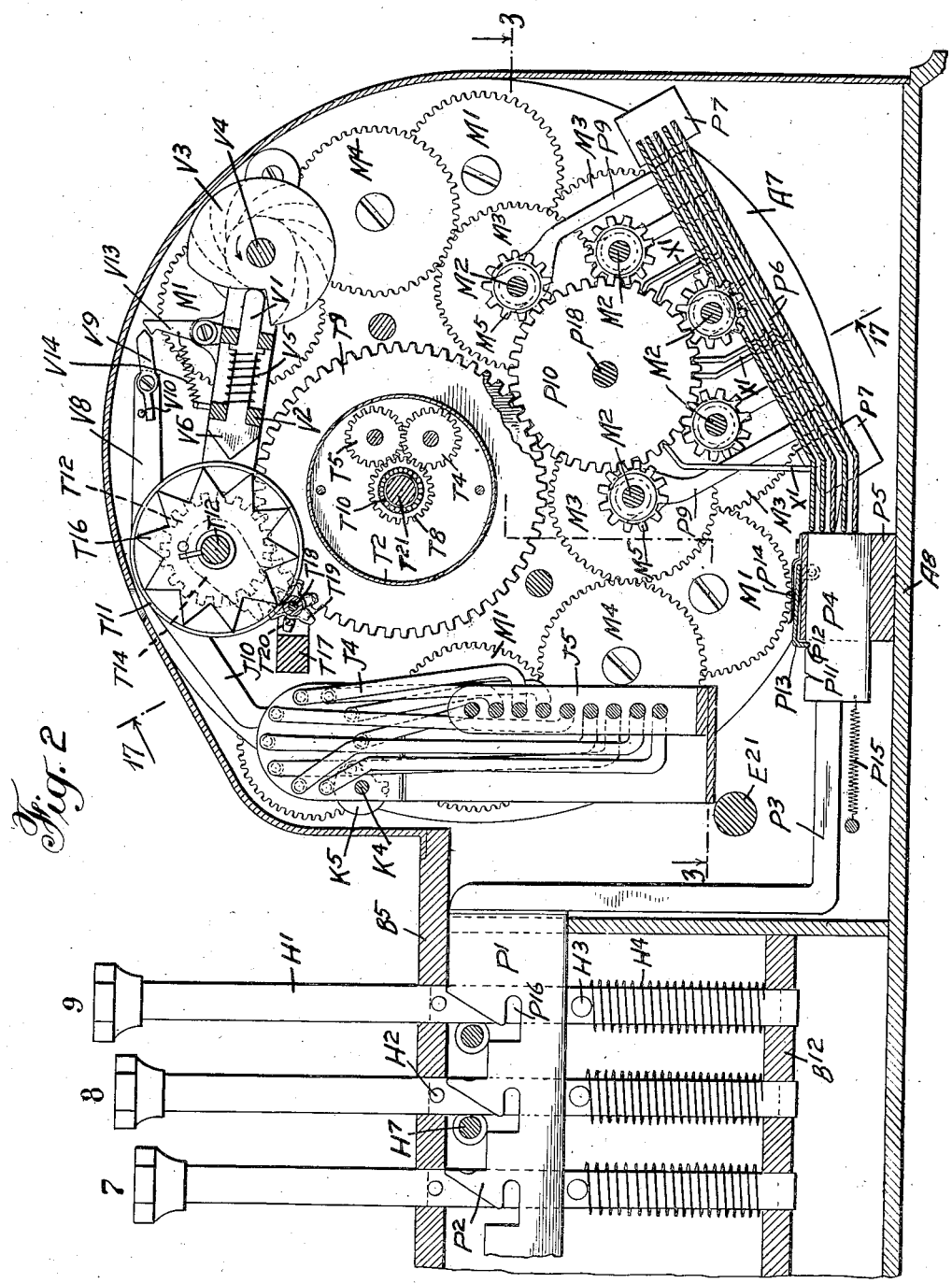
Fig. 2 is an enlarged section on line 2—2 of Fig. 1.

The rectifying mechanism comprises a positioning finger $V^1$ for each dial and motor operated cam mechanism for actuating the fingers. The bridge $V^2$ supports the ten positioning fingers in registry with the ten star wheels $T^{16}$, which are individually fastened in proper position to the ten indicators $T^{11}$. The cams $V^3$ are fastened on the shaft $V^4$ and are so cut that the finger of lowest denomination is first actuated, and then the one of the next higher denomination, and so on until the finger of highest denomination is actuated, whereupon the low parts of all the cams register with the rear ends of the fingers and permit the springs $V^5$ to disengage them all simultaneously. (Figs. 1 and 2). The heads $V^6$ of the fingers are wedge shaped so as to fit between the teeth of the star wheels $T^{16}$. As a result of the successive actuation of the fingers in the order of ascending denomination, the gradual loss of transfer movements and the back lash in the differential gearings is taken up progressively in such manner that the correct figures on the indicators are brought to a straight reading line throughout, irrespective of the previous direction of rotation of the indicators, even though a considerable amount of back lash occurred in the gears between the multiplying disk and the adding mechanism.

The shaft $V^4$ is turned one complete rotation by a spring motor $V^7$ and is then stopped, the motor being released by the arm $V^8$ at the time the dog $J^{10}$ is fully depressed to stop the multiplying disk. (Figs. 1, 2, 7 and 12). The arm $V^8$ is fastened to the dog $J^{10}$ and is provided with a trip $V^9$ and a pin stop $V^{10}$ therefor, while the shaft $V^4$ carries a disk $V^{11}$ with a single tooth $V^{12}$ adapted to be caught by the pivoted pawl $V^{13}$. The trip actuates the pawl to release the shaft $V^4$ at the very end of the depression of the dog $J^{10}$, while the spring $V^{14}$ immediately thereafter pulls the pawl into position to engage the tooth and stop the rotation of the shaft $V^4$ and the cams thereon when one rotation has been completed. During the upward movement of the dog, to permit the rotation of the multiplying disk, the trip turns on its pivot and when it is below the tail of the pawl, the spring on the trip raises it to operative position.

The spring motor $V^7$ for rotating the shaft $V^4$ is extended from any position which it may have to its fully tensioned position when the winding handle $E^{20}$ is operated, the spring then being capable of turning the shaft for five successive operations. (Figs. 1 and 7). For this purpose, the toothed segment $W^1$ pivoted on the stud $W^2$ has a cam extension $W^3$ which is moved to its extreme position, indicated in full lines, by the cam $W^4$ on the shaft $E^{21}$. On the return stroke of the handle, the cam passes the cam extension without effect. The compound gearing $W^5$, $W^6$, $W^7$ turns the pawl $W^9$ without turning the shaft $V^4$ when the spring is being tensioned, but when the tooth $V^{12}$ is released by the pawl $V^{13}$, the spring turns the shaft $V^4$ through the ratchet $W^8$ and the spring-pressed pawl $W^9$ which is pivoted on the disk $W^{10}$ fastened on the shaft.

When the handle $E^{20}$ is being operated to wind the spring motors $E^1$ and $V^7$, the indicators of the adding mechanism are cleared or reset to 0. As is well known, the driving component of a differential gearing must be locked against rotation during the transfer of a unit to its indicator. Thus each clutch plate carries a lock bar $X^1$ which locks those gears $P^{10}$ which are not at the time engaged by the gears $M^5$ and therefore locked by reason of the engagement of the corresponding gear $A^9$ with the pins of the multiplying disk or with a lock $A^{16}$. (Figs. 2, 3 and 17). Since none of the gears $M^5$ ever engage the gear $P^{10}$ of the carry-over indicator at the extreme left of the adding mechanism, each clutch plate is adapted to lock that gear when it clutches in its set of gears. However, when the indicators are to be cleared, one component of each differential gearing must be released. This is accomplished by moving all the clutch plates to their unclutching position, my providing a cam $Z^1$ on the shaft $E^{21}$ to force the finger $Z^2$ toward the rear of the machine, and thereby shift back the clutch plate which was left in its clutching position after the depression of the last multiplier key. (Figs. 1, 3, 12 and 15). This operation is performed during the first part of the movement of the handle $E^{20}$ from its normal position. Immediately thereafter the two teeth of the mutilated gear $Z^3$ engage the toothed extension $Z^4$ of the segment and cause the toothed part $Z^5$ to turn the gear $Z^6$ and the shaft $T^{12}$ nearly one complete rotation, whereupon the mutilated gear passes out of engagement with the toothed extension, the segment being held by the spring clips $Z^8$. During the first part of this rotation, the shaft $T^{12}$ is moved axially toward the left in Fig. 1 by means of the pin and slot connection at $Z^9$, whereupon the pins $Z^{10}$ carried by the shaft come into line with the pins $Z^{11}$ on the star wheels $T^{16}$. Each indicator is then brought to 0 from whatever position it may have had, the shaft $Z^7$ being turned in the opposite direction upon returning the handle $E^{20}$ to its normal position. At the end of the return movement, the shaft $T^{12}$ is moved back and the pins $Z^{10}$ are moved out of the path of rotation of the pins $Z^{11}$. The spring $Z^{12}$ is permitted to pull the finger $Z^2$ out of engagement with the clutch plates as soon as another finger is started in the movement to clutch in a set of gears $M^5$.

Having thus described our invention, what we claim is:

1. In a calculating machine, a double-face multiplying disk having on each face a plurality of engaging points arranged in circles and forming a number of sectors separated from each other by radial passages, a plurality of gears on each face mounted on radially-disposed shafts divergent to each other so as to be simultaneously movable along said passages into engagement with selected circles of engaging points, means for rotating the multiplying disk through one or more of said sectors, and an adding mechanism on which the rotation of the gears by the engaging points is registered.

2. In a calculating machine, a double-face multiplying disk having sectors of engaging points on both of its faces, the sectors on one face being staggered relatively to the sectors on the other face, gears engageable with the engaging points of both faces, and an adding mechanism on which the actuation of the gears by the engaging points is registered.

3. In a calculating machine, a rotatable multiplying disk having engaging points on its face and also having a continuous circle of teeth around its periphery, a gear engageable with the engaging points, an adding mechanism on which the actuation of the gear by the engaging points is registered, and driving mechanism engaged with the teeth on the periphery of the disk.

4. In a calculating machine, a rotatable multiplying member having a plurality of series of actuating means and a like plurality of stopping abutments, a gear engageable with said actuating means, an adding mechanism on which the actuation of the gear is registered, driving mechanism for the multiplying member, and a member cooperating with the abutments to stop the multiplying member when a certain number of said series of actuating means have passed said gear.

5. In a calculating machine, a rotatable multiplying member having a plurality of series of actuating means and a like plurality of stopping abutments, a gear engageable with said actuating means, an adding mechanism on which the actuation of the gear is registered, reversible driving mechanism for rotating the multiplying member in either direction, and mechanism engageable with the abutments to stop the multiplying number when a certain number of said series of actuating means have passed said gear in either direction of rotation.

6. In a calculating machine, a rotatable multiplying disk having concentric series of engaging points on its face forming sectors with passages therebetween and also having a plurality of abutments around its periphery, a gear engageable with the engaging points and movable along said passages from one to another of said series, an adding mechanism on which the actuation of the gear by the engaging points is registered, driving mechanism for the multiplying disk, and a member engageable with the abutments to stop the multiplying disk with a passage in registry with the gear.

7. In a calculating machine, a rotatable multiplying disk having concentric series of engaging points of its face forming sectors with passages therebetween and also having a plurality of abutments around its periphery, a gear engageable with the engaging points and movable along said passages from one to another of said series, an adding mechanism on which the actuation of the gear by the engaging points is registered, reversible driving mechanism for rotating the multiplying disk in either direction, and mechanism engageable with the abutments to stop the multiplying member with a passage in registry with the gear irrespective of the direction of rotation.

8. In a calculating machine, a rotatable multiplying disk having engaging points on its face, two or more gears movable in diverging lines in engagement with the engaging points, and gear positioning members movable in parallel lines and connected to the individual gears, and an adding mechanism on which the actuation of the gears by the engaging points is registered.

9. In a calculating machine, a rotatable multiplying disk having engaging points on its face, two or more gears movable in diverging lines in engagement with the engaging points, a set of racks connected to the gears, a set of positioning racks movable in parallel lines, gears intermediate the two sets of racks, and an adding mechanism on which the actuation of the gears by the engaging points is registered.

10. In a calculating machine, a multiplying mechanism having a set of gears disposed around a circle, an adding mechanism having a set of driving gears of smaller diameter than the diameter of the circle on which the other set of gears is disposed, transmitting connections extending from the first set of gears and engageable with the driving gears, and clutch members having shipping devices reaching around the driving gears to engage the transmitting connections therewith.

11. In a calculating machine, a multiplying mechanism, an adding mechanism having individual driving gears for the different denominations, transmitting connections connected to the multiplying mechanism and having a set of spur gears in constant connective relation with said driving gears, and a clutch member designed to move said set of gears into connection with a series of denominations of said driving gears in accordance with the denomination of a multiplier digit.

12. In a calculating machine, a multiplying mechanism, an adding mechanism having individual driving gears for the different denominations, transmitting connections connected to the multiplying mechanism and having a plurality of sets of gears in constant connective relation with said driving gears, and individual clutch members for the different multiplier denominations, each clutch member being designed to connect one of said sets of gears to the series of driving gears corresponding thereto in denomination.

13. In a calculating machine, a multiplying mechanism, an adding mechanism, transmitting connections connected to the multiplying mechanism and in constant connective relation with the adding mechanism, and a plurality of individually-movable superposed clutch-plates each designed to connect the transmitting connections to a certain series of denominations of the adding mechanism.

14. In a calculating machine, a multiplying mechanism, an adding mechanism, transmitting connections connected to the multiplying mechanism and in constant connective relation with the adding mechanism, and a plurality of individually-movable superposed clutch-plates each carrying a series of connecting elements projecting through openings in the members above for operatively connecting the transmitting connections to a certain series of denominations of the adding mechanism.

15. In a calculating machine, a multiplying mechanism, an adding mechanism, transmitting connections connected to the multiplying mechanism and in constant connective relation with the adding mechanism, a clutch member movable to operatively connect the transmitting connections to a series of denominations of the adding mechanism corresponding to the denomination of a multiplier digit, and individual operating devices for the several multiplier denominations each effective to position the clutch member.

16. In a calculating machine, a multiplying mechanism, an adding mechanism, transmitting connections connected to the multiplying mechanism and in constant connective relation with the adding mechanism, and a denomination selecting mechanism comprising individual clutch members for the several denominations of the multiplier wherein each clutch member is movable to operatively connect the transmitting connections to a certain series of denominations of the adding mechanism, and also comprising individual operating devices for the sectional multiplier denominations wherein each operating device is effective on all the clutch members to position them.

17. In a calculating machine, a multiplying mechanism, an adding mechanism, transmitting connections connected to the multiplying mechanism and in constant connective relation with the adding mechanism, and a denomination selecting mechanism comprising individual clutch members for the several denominations of the multiplier wherein each clutch member is movable to operatively connect the transmitting connections to a series of denominations of the adding mechanism, and also comprising individual operating devices for the several multiplier denominations wherein each operating device is effective to position one clutch member in its connected position and to position the other clutch members in their disconnected positions.

18. In a calculating machine, a multiplying mechanism, an adding mechanism, transmitting connections connected to the multiplying mechanism and having a plurality of sets of gears wherein each set is in constant connective relation with a different series of denominations of the adding mechanism, and a denomination selecting mechanism designed to disconnect any set of gears which may be connected to the adding mechanism at the time and to connect thereto that set of gears which corresponds to the denomination of the multiplier being operated upon.

19. In a calculating machine, a multiplying mechanism, an adding mechanism, transmitting connections connected to the multiplying mechanism and having a plurality of sets of gears wherein each set is in constant connective relation with a different series of denominations of the adding mechanism, and a denomination selecting mechanism effective to simultaneously disconnect any set of gears which may be connected to the adding mechanism at the time and to connect thereto that set of gears which corresponds to the denomination of the multiplier being operated upon.

20. In a calculating machine, a multiplying mechanism, an adding mechanism, transmitting connections connected to the multiplying mechanism and having a plurality of sets of gears in constant connective relation with the adding mechanism, and a denomination selecting mechanism comprising a plurality of clutch members each connected to a different set of gears and each having a V-slot for each multiplier denomination, and also comprising individual operating devices movable into the V-slots, the arrangement being such that the corresponding V-slots in all the clutch members except one are in alinement, whereby when an operating device is moved into the V-slots one of the clutch members is moved to connect its set of gears to the adding mechanism.

21. In a calculating machine, a multiplying mechanism, an adding mechanism, transmitting connections connected to the multiplying mechanism and having individual sets of gears for the several multiplier denominations, and a denomination selecting mechanism comprising individual clutch members for moving the several sets of gears into and out of engagement with different series of denominations of the adding mechanism, individual operating devices for the several clutch members, and multiplier keys effective to actuate the operating devices, the arrangement being such that the last operated clutch member holds its set of gears in engagement with the adding mechanism until a multiplier key of another denomination is actuated.

22. In a calculating machine, a multiplying mechanism, an adding mechanism, transmitting connections connected to the multiplying mechanism and in constant connective relation with the adding mechanism, denomination selecting members, individual operating devices for the several multiplier denominations wherein each operating device is movable into coöperation with said members to connect the transmitting connections to that series of denominations of the adding mechanism which corresponds to the denomination of the multiplier, and latching mechanism for the operating devices designed to release a latched device when another device is moved to latching position.

23. In a calculating machine, a multiplying mechanism, an adding mechanism, transmitting connections connected to the multiplying mechanism and in constant connective relation with the adding mechanism, denomination selecting members, operating devices for the several multiplier denominations wherein each operating device is movable into coöperation with said members to connect the transmitting connections to that series of denominations of the adding mechanism which corresponds to the denomination of the multiplier, denominational shift plates for the several operating devices, and multiplier keys of different denominations coöperative with the shift plates, the arrangement being such that the operation of a multiplier key moves a shift plate into coöperation with the corresponding operating device to connect the transmitting connections with the adding mechanism and then permits the shift plates to move back to latch the key in indicating position.

24. In a calculating machine, a multiplying mechanism, an adding mechanism connected thereto, a denominational bank of multiplier keys, and interlocking mechanism preventing the depressing of another key while the multiplying mechanism is operating and comprising plungers actuated by individual keys and having engaging notches, and also comprising a movable member associated with the multiplying mechanism and engageable with the notches of all the plungers when the multiplying mechanism is operating so as to lock the keys against depression at that time.

25. In a calculating machine, a motor-operated multiplying mechanism, an adding mechanism connected to the multiplying mechanism, and controlling mechanism comprising a plurality of banks of keys, a controller rotatable with the multiplying mechanism, a plurality of rocking shafts wherein the keys of like value in the different banks operate the same rocking shaft, connections between the individual rocking shafts and the controller for predetermining the actuation of the multiplying mechanism in accordance with the value of the key depressed, and motor releasing mechanism operated upon depression of a key.

26. In a calculating machine, a motor-operated multiplying mechanism, an adding mechanism connected to the multiplying mechanism, and controlling mechanism determinating the actuation of the multiplying mechanism in accordance with the digits 1 to 9 and comprising a plurality of banks of keys, spring-positioned rocking shafts operated by the keys, and a controller actuated by the rocking shafts upon depression of the keys, said rocking shafts admitting of the elevation of the keys without actuating the controller.

27. In a calculating machine, a motor-operated multiplying mechanism, an adding mechanism connected to the multiplying mechanism, and controlling mechanism determining the actuation of the multiplying mechanism in accordance with the digits 1 to 9 and comprising a controller rotatable with the multiplying mechanism and having a series of normally ineffectively positioned stopping elements adapted upon displacement from that position to limit the actuation of the multiplying mechanism and then hold the multiplying mechanism at rest, and motor releasing mechanism effective to return the displaced element to its normal position and thereby permit further actuation of the multiplying mechanism.

28. In a calculating machine, a motor-operated multiplying mechanism, an adding mechanism connected to the multiplying mechanism, and controlling mechanism comprising keys, a controller having elements connected to the keys and set thereby to limit the actuation of the multiplying mechanism in accordance with the digits 1 to 9 and then hold the multiplying mechanism at rest, and motor releasing mechanism actuated by the keys and comprising a swinging arm effective to displace the previously set element of the controller from its locking position.

29. In a calculating machine, a multiplying mechanism including a multiplying member having stopping abutments, an adding mechanism connected to the multiplying mechanism, and controlling mechanism admitting rotation of the multiplying member in amounts proportional to the digits 1 to 9, said controlling mechanism having a pawl movable out of engagement with the engaged abutment to release the multiplying member and into the path of the abutments to stop the multiplying member after the predetermined amount of rotation.

30. In a calculating machine, a multiplying mechanism including a multiplying member having stopping abutments, an adding mechanism connected to the multiplying mechanism, and a controlling mechanism comprising a controller rotatable with the multiplying member and having elements capable of being projected, a pawl coöperative with the abutments, and a pivoted lever connected to the pawl and to a spring tending to hold the pawl disengaged from the abutments, the elements, when projected, being designed to engage the lever and move the pawl into the path of the abutments to stop the multiplying member after a predetermined amount of rotation proportional to the digits 1 to 9.

31. In a calculating machine, a motor-driven multiplying mechanism including a multiplying member having stopping abutments, an adding mechanism connected to the multiplying mechanism, and controlling mechanism comprising a pawl adapted to move out of engagement with an abutment to release the multiplying member and to move into the path of the abutments to stop the multiplying member, a controller having elements displaceable from an ineffective position to move the pawl to its stopping position after a predetermined amount of rotation of the multiplying member in accordance with the digits 1 to 9, and motor releasing mechanism including a member which, upon movement from normal position, restores the displaced element to said ineffective position but holds the pawl in engagement with the abutment until it is returned to normal position.

32. In a calculating machine, a motor-driven multiplying mechanism including a multiplying member having stopping abutments, an adding mechanism connected to the multiplying mechanism, a pivoted pawl which in its lowered position engages the abutments to stop the multiplying member in exact position and which in its raised position disengages the abutments to admit rotation of the multiplying member, a releasing mechanism designed to raise the pawl, and a controller designed to lower the pawl after a predetermined amount of rotation of the multiplying member in accordance with the digits 1 to 9.

33. In a calculating machine, a motor-operated reversible multiplying mechanism including a multiplying member having stopping abutments, an adding mechanism connected to the multiplying mechanism, and controlling mechanism for the multiplying member determining the amount of its rotation in both directions in accordance with the digits 1 to 9 and including two pawls one of which engages one side of the abutments upon rotation in one direction to stop the multiplying member in exact position and the other of which engages the other side of the abutments upon rotation in the other direction to stop the multiplying member in the same position.

34. In a calculating machine, a multiplying mechanism including a multiplying disk having gear teeth and stopping abutments around its periphery, an adding mechanism connected to the multiplying mechanism, motor driving mechanism including a gear engaged with said gear teeth, and controlling mechanism determining the amount of rotation of the multiplying disk in accordance with the digits 1 to 9 and including a pawl which in one position disengages the abutments to release the driving mechanism and which in another position engages the abutments to stop the multiplying disk and holds it against actuation.

35. In a calculating machine, an adding mechanism having differential gearings of successive denominations and transfer mechanisms therebetween, each of said differential gearings comprising a driving component carrying meshed pinions, a transfer receiving component carrying a gear meshed with one of the pinions, and an indicator actuating component carrying a gear meshed with the other pinion.

36. In a calculating machine, an adding mechanism having differential gearings of successive denominations and transfer mechanisms therebetween, each of said differential gearings comprising a driving component carrying two pinions meshed over part of their faces and projecting outwardly on opposite sides, a transfer receiving component carrying an axially-disposed toothed ring meshed with the projecting face of one pinion, an indicator actuating component carrying an axially-disposed toothed ring meshed with the projecting face of the other pinion, and a shaft on which the three members are mounted for rotation.

37. In a calculating machine, a registering mechanism, a differential adding mechanism connected thereto and having dials with attached positioning elements, and rectifying mechanism comprising fingers cooperative with the positioning elements to bring the dial figures into a straight reading line, cams designed to actuate the fingers in the order of ascending denomination, and means rotating the cams after the registration on the adding mechanism is completed.

38. In a calculating machine, a registering mechanism, a differential adding mechanism connected thereto and having dials with attached star wheels, and rectifying mechanism comprising spring pressed fingers coöperative with the star wheels to bring the dial fingers into a straight line, cams designed to actuate the fingers in the order of ascending denomination and to then release all the fingers simultaneously, and means rotating the cams after the registration on the adding mechanism is completed.

39. In a calculating machine, a multiplying mechanism, a differential adding mechanism, transmitting connections connected to the multiplying mechanism and in constant connective relation with the different series of denominations of the adding mechanism, a plurality of clutch plates designed to connect the multiplying mechanism with the series of denominations of the adding mechanism that corresponds to the denomination of the multiplier digit, and lock bars carried by the individual clutch plates and designed to lock against retrogression those differential elements of the adding mechanism which are of higher denomination than the highest denomination engaged by the transmitting connections at the time.

40. In a calculating machine, a multiplying mechanism, a differential adding mechanism, transmitting connections connected to the multiplying mechanism and in constant connective relation with different series of denominations of the adding mechanism, a plurality of clutch plates designed to connect the multiplying mechanism with the series of denominations of the adding mechanism that corresponds to the denomination of the multiplier digit, and lock bars carried by the individual clutch plates and designed to lock against retrogression all of those denominations of the adding mechanism which are disengaged from the transmitting connections at the time.

41. In a calculating machine, a multiplying mechanism, an adding mechanism, transmitting connections connected to the multiplying mechanism and in constant connective relation with different series of denominations of the adding mechanism, a plurality of clutch plates wherein each is designed to connect the transmitting connections with the series of denominations of the adding mechanism that corresponds to the denomination of the multiplier digit and also wherein each is designed to maintain said connection until another clutch plate is actuated, and clearing mechanism which first actuates the last clutch plate to entirely disconnect the transmitting connections from the adding mechanism and then resets the adding mechanism to zero.

42. In a calculating machine, a multiplying mechanism, an adding mechanism connected thereto, a spring motor designed to actuate the multiplying mechanism for several successive multiplier digits, a rectifying mechanism positioning the dial figures in a straight reading line, a spring motor driving the rectifying mechanism after each actuation of the multiplying mechanism, and winding mechanism acting simultaneously on both spring motors to wind them for the several successive actuations.

43. In a calculating machine, a multiplying mechanism comprising a rotatable multiplying disk having axially-extending projections arranged over its face in concentric circular series extending in close proximity to the center of the disk, and also comprising a gear having its teeth beveled off near the inner end of its face so that the innermost circle of projections enters therebetween during rotation, and an adding mechanism connected to said gear.

In testimony whereof we affix our signatures, in presence of two witnesses.

LEON W. ROSENTHAL.
MARCUS C. HOPKINS.

Witnesses to signature of Leon W. Rosenthal:
M. A. BELL,
K. M. SCHULZ.

Witnesses to signature of Marcus C. Hopkins:
HUGH DAVIS,
C. W. POWER.